(12) United States Patent
Yang et al.

(10) Patent No.: US 9,504,017 B2
(45) Date of Patent: Nov. 22, 2016

(54) METHOD AND APPARATUS TO INCREASE SERVICE CAPACITY IN RADIO COMMUNICATION SYSTEMS USING IDLE WORKING CHANNELS AS FLEXIBLE CONTROL CHANNELS

(71) Applicant: MOTOROLA SOLUTIONS, INC, Schaumburg, IL (US)

(72) Inventors: Yunhai Yang, Elgin, IL (US); Daniel J McDonald, Cary, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 203 days.

(21) Appl. No.: 14/040,220

(22) Filed: Sep. 27, 2013

(65) Prior Publication Data

US 2015/0094109 A1 Apr. 2, 2015

(51) Int. Cl.
*H04B 7/00* (2006.01)
*H04W 72/02* (2009.01)
*H04W 72/04* (2009.01)

(52) U.S. Cl.
CPC ......... *H04W 72/02* (2013.01); *H04W 72/0406* (2013.01)

(58) Field of Classification Search
CPC .................................................. H04W 72/0493
USPC ....................................................... 455/509
See application file for complete search history.

(56) References Cited

U.S. PATENT DOCUMENTS

| 6,512,751 B1 | 1/2003 | Struhsaker et al. |
| 8,160,098 B1 | 4/2012 | Yan et al. |
| 8,494,063 B1 * | 7/2013 | Reudink ............... H04L 1/0025 370/252 |
| 2007/0225044 A1 * | 9/2007 | Law ..................... H04W 74/08 455/562.1 |
| 2008/0233954 A1 * | 9/2008 | Ibrahim ................. H03L 7/181 455/434 |

FOREIGN PATENT DOCUMENTS

| AU | 2009298799 A1 | 4/2011 |
| EP | 891087 B1 | 12/2008 |
| GB | 2260877 A | 4/1993 |
| WO | 9408431 A1 | 4/1994 |
| WO | 2013073976 A1 | 5/2013 |

\* cited by examiner

*Primary Examiner* — Wesley Kim
*Assistant Examiner* — Raj Chakraborty

(57) ABSTRACT

A subscriber unit-based method and a subscriber unit include locally maintaining a status of each working channel of a plurality of working channels in a wireless communication system; responsive to an inbound request, selecting one of a plurality of idle working channels of the plurality of working channels and a dedicated control channel; and sending the inbound request on the selected channel. An infrastructure-based method is also provided. Variously, the methods and systems increase service capacity in radio communication systems using idle working channels as flexible control channels. An infrastructure-based method is also described.

17 Claims, 6 Drawing Sheets

METHOD AND APPARATUS TO INCREASE SERVICE CAPACITY IN RADIO COMMUNICATION SYSTEMS USING IDLE WORKING CHANNELS AS FLEXIBLE CONTROL CHANNELS

BACKGROUND OF THE INVENTION

The present disclosure relates generally to radio communications systems and methods. In conventional trunked radio systems, such as Terrestrial Trunked Radio (TETRA), Project 25 (P25) or the like, multiple subscriber units (SU) can participate in various voice and/or data sessions therebetween via various available channels ($CH_1 \ldots CH_n$). These systems utilize a dedicated control channel (CC) for coordination of various activity in the system and transmission and exchange of control information, such as, for example, voice call requests and/or grants, mobility requests and/or grants, data context activation requests, etc. As system activity increases and the number of SUs scale, the single dedicated control channel may become a limitation. For example, in an exemplary trunked radio system, the control channel can be a single inbound frequency for multiple access control using a slotted ALOHA algorithm. For a single try, the channel efficiency is about 36.8%. For multi-try (up to 5 tries according to an exemplary design), the inbound CC can support around 7 Inbound Signaling Packet (ISP)/sec with ~95% reliability. As the SU requests increase, such as push-to-talk (PTT) requests for voice, mobility, and/or data context activation requests, the increased collisions on the inbound (IB) CC may cause the reliability of ISP transmission to drop and may make the channel unusable. As a result, it could take longer time (up to five tries with back off timers) to send in a successful request. In case of a voice call request, the access time to a working voice channel would be delayed and could potentially cause audio truncation at the beginning of a voice transmission.

Conventional techniques to address control channel limitations include assigning additional control channels to increase capacity. However, such techniques reduce available working channels (i.e., reducing available resources available for voice and/or data traffic channels) and still encounter the same aforementioned limitations, namely control channel resources are fixed.

Accordingly, there is a need for a method and apparatus to increase service capacity in radio communication systems using idle working channels as flexible control channels.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
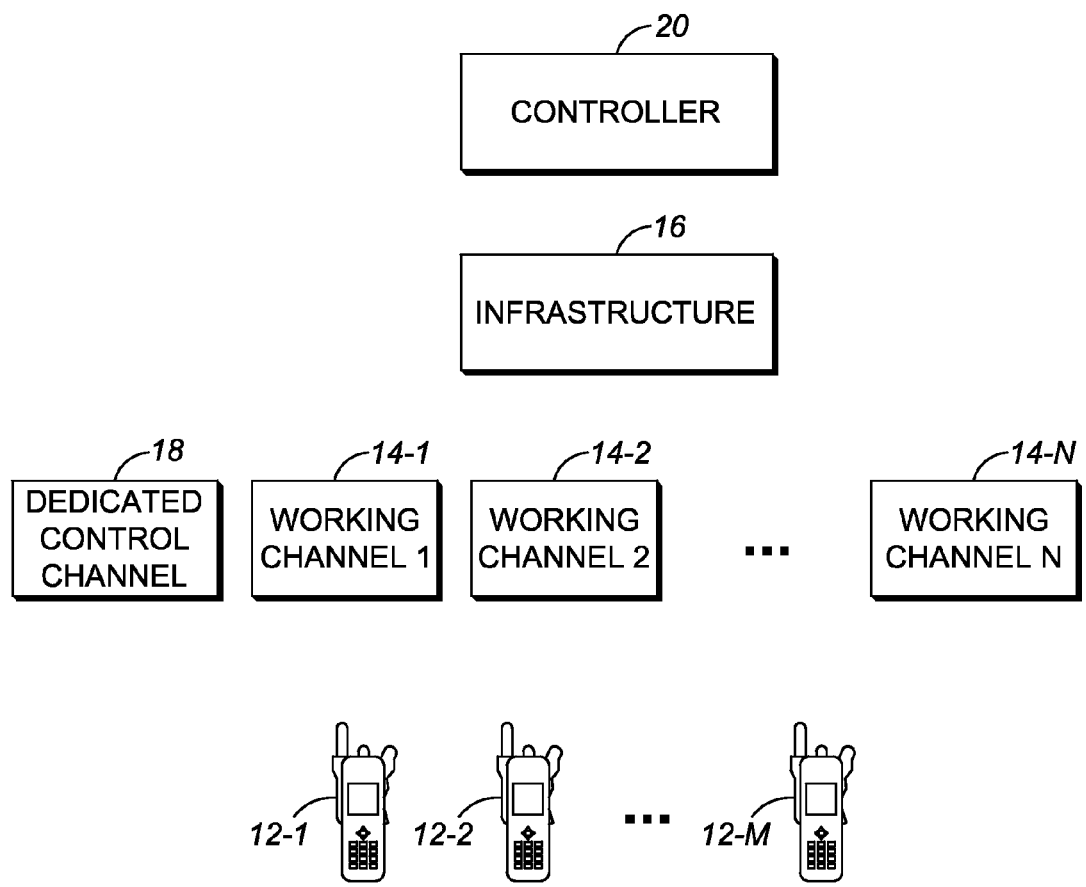
FIG. 1 is a network diagram of a wireless communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In an exemplary embodiment, a subscriber unit-based method using idle working channels as flexible control channels includes locally maintaining, by a requesting subscriber unit, a status indication of each working channel of a plurality of working channels in a wireless communication system; responsive to detecting a request for transmission of control information on an inbound control channel: determining, via the status indications, which working channels are currently idle; selecting a channel out of a plurality of available channels comprising (i) the determined idle working channels and (ii) a dedicated control channel; and sending, by the requesting subscriber unit, the request on the selected channel.

In another exemplary embodiment, a subscriber unit using idle working channels as flexible control channels includes a radio configured to operate on a plurality of channels comprising a control channel and a plurality of working channels in a wireless communication system; a processor communicatively coupled to the radio; and memory storing instructions that, when executed, cause the processor to: locally maintain a status indication of each working channel of the plurality of working channels; responsive to detecting a request for transmission of control information on an inbound control channel: select a channel out of a plurality of available channels comprising (i) the determined idle working channels and (ii) a dedicated control channel; and cause the radio to send the request on the selected channel.

In yet another exemplary embodiment, an infrastructure-based method using idle working channels as flexible control channels includes receiving, in an infrastructure, a request associated with control information from a requesting subscriber unit on one of (i) a determined idle working channel and (ii) a dedicated control channel, where the determined idle working channel is determined locally by the requesting subscriber unit; selecting a channel out of (i) the determined idle working channel and (ii) the dedicated control channel; and sending, by the infrastructure, a response to the request to the requesting subscriber unit on the selected channel.

FIG. 1 is a network diagram of a wireless communication system 10 in accordance with some embodiments. The wireless communication system 10 includes a plurality of SUs 12, e.g. M SUs each labeled SU 12-1, 12-2, ..., 12-M. The SUs 12 are configured to wirelessly communicate (e.g. voice and/or data, via a one-to-one or one-to-many transmission) in the wireless communication system 10 over any of N working channels 14, labeled working channels 14-1, 14-2, ..., 14-N. The SUs 12 utilize working channels 14 for communication sessions to an infrastructure 16. The infrastructure 16 can include various components which are omitted for simplicity. For example, any number of the SUs 12 can participate in talkgroups between other SUs 12 on demand. The wireless communication system 10 can be a trunked radio system, such as TETRA or P25, and can support a virtually unlimited number of talkgroups. The talkgroups can be served by any of the working channels 14, and can be served by different channels at different times. The wireless communication system 10 takes advantage of a shared channel system to increase flexibility, efficiency, and bandwidth utilization. That is, the wireless communication system 10, as a trunked system, allows more SUs 12 to carry on more conversations, over fewer distinct channels, and this applies to data and/or voice sessions.

The wireless communication system 10 includes a dedicated control channel (CC) 18. The dedicated control channel 18 is similar to the N working channels 14 in that it also enables communication between the SUs 12 and the infrastructure 16, but the dedicated control channel 18 is dedicated for exchange of control-related information for the wireless communication system 10 and not for data and/or voice sessions. The dedicated control channel 18 can include two channels (or can be viewed as a single, full duplex channel)—an inbound (IB) control channel where the SUs 12 receive data from the infrastructure 16 and an outbound (OB) control channel where the SUs 12 transmit data to the infrastructure 16. The IB control channel and the OB control channel can share the same frequencies or be at different frequencies. As described herein, each of the channels 14, 18 is a communication channel for exchanging data between the SUs 12 and the infrastructure 16. This communication channel can be a wireless frequency using any known access mechanism technique, e.g. Time Division Multiple Access (TDMA), Code Division Multiple Access (CDMA), Frequency Division Multiple Access (FDMA), and the like.

Generally, the dedicated control channel 18 is utilized for communication of set-up and tear-down information between the SUs 12 and a controller 20 (that can be part of or connected to the infrastructure 16). Generally, the infrastructure 16 can include all of the fixed equipment in the wireless communication system 10, i.e. everything that does not move. The controller 20 can be referred to as a trunking controller, a site controller, a resource allocator, a channel allocator, etc. The SUs 12 are configured to monitor the dedicated control channel 18 for channel assignment instructions as well as for currently-used channels of the N working channels 14. The dedicated control channel 18 is used to convey control signaling associated with the N working channels 14, e.g. the SUs 12 can monitor the dedicated control channel 18 for individual or group call working channel assignments to one of the N working channels 14. In other words, working channels are normally reserved for voice and/or data traffic assigned on an as-needed basis for requested individual or group calls, and may also be considered available channels in a system other than the dedicated control channel.

In a call-setup example, a particular SU 12 can request an individual or group call over the dedicated control channel 18 and receive an assignment of a particular working channel 14 over the dedicated control channel 18 from the controller for the transmission of traffic for the requested call. In operation of the wireless communication system 10, the N working channels 14 can be either in-use (i.e., currently used in a communication session) or idle. In an exemplary aspect, each of the SUs 12 continuously tracks the usage state of all of the N working channels 14 locally through monitoring of the dedicated control channel 18 and updating status changes accordingly.

In various exemplary embodiments, the wireless communication system 10 utilizes idle working channels of the N working channels 14 as flexible control channels on an as-needed basis. Control channel traffic can be characterized as whether it needs to be monitored by all of the SUs 12 or whether it is solely between a single SU 12 and the controller 20. For example, working channel assignments need to be monitored by all of the SUs 12 to keep track of the N working channels 14 whereas requests for a working channel are not required to be monitored by all of the SUs 12. For example, requests can be characterized as inbound requests (from the SUs 12) and outbound requests (to the SUs 12). In some embodiments, all inbound requests can be referred to as individually targeted (such as in P25 systems) where a single SU 12 is making a request. Outbound requests can be individually targeted or for all SUs 12 to monitor. For example, registration signaling is individually targeted inbound and the response is also individually targeted outbound, e.g., to the requesting radio.

With this, the wireless communication system 10 utilizes idle working channels of the N working channels 14 as flexible control channels for transmission of control channel traffic that does not need to be seen by all of the SUs 12 (i.e., is control channel traffic that is individually targeted). In operation, the use of the SUs 12 and the controller 20 can automatically use the idle working channels without coordination with other SUs 12 or the controller 20 on an as needed basis and on an as available basis. This provides out-of-band load sharing for the in-band signaling channel (i.e., the dedicated control channel 18) and effectively reduces the load on the dedicated control channel 18 without impacting overall channel capacity.

Figure 2:
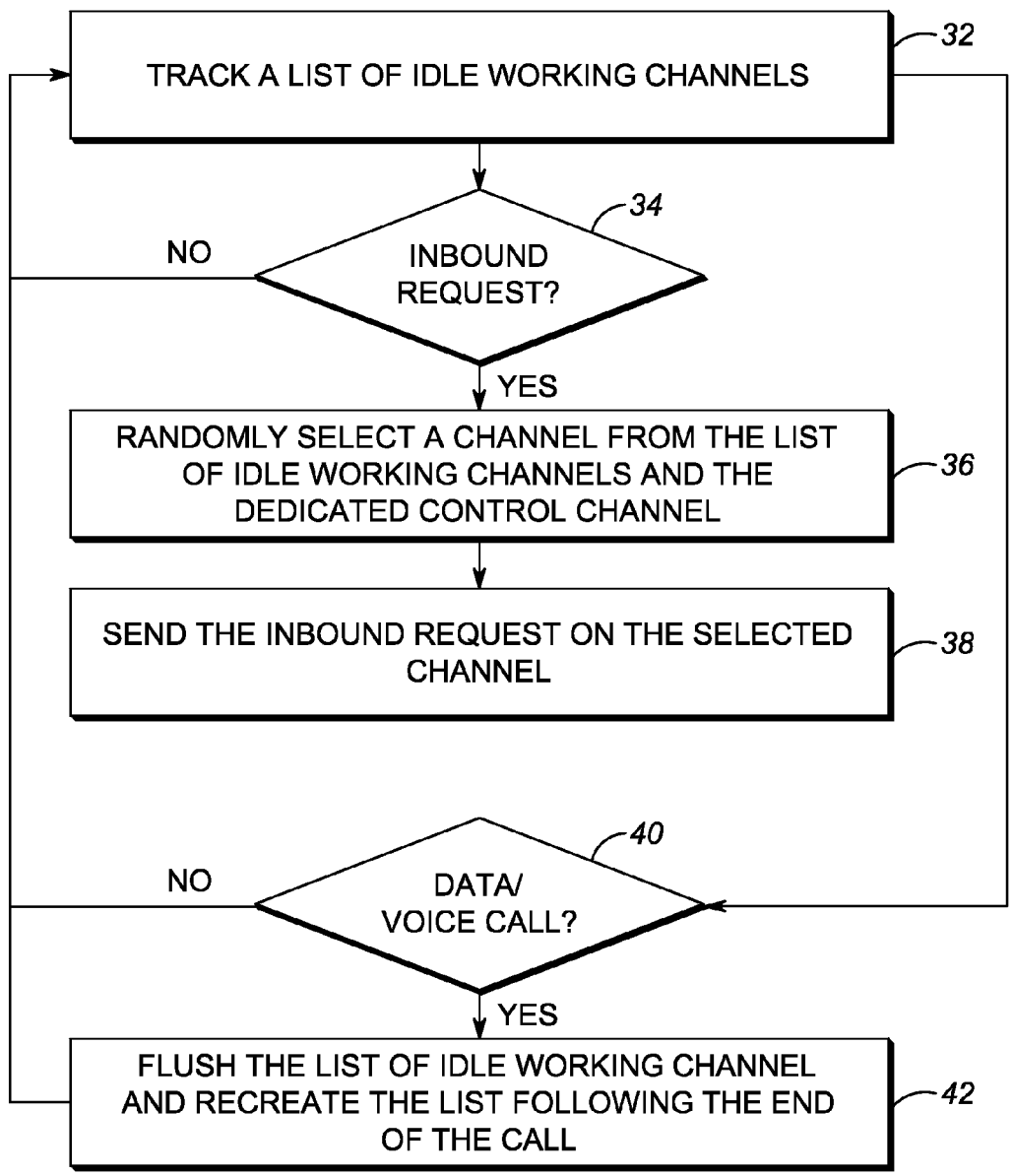
FIG. 2 is a flowchart of a SU method for utilizing idle working channels as flexible control channels in accordance with some embodiments.

FIG. 2 is a flowchart of a SU method 30 for utilizing idle working channels as flexible control channels in accordance with some embodiments. The SU method 30 can be implemented by one of the SUs 12 in the wireless communication system 10. The SU method 30 includes tracking a list of idle working channels (step 32). In tracking the list, the SU 12 can monitor the dedicated control channel 18 and continuously update the list based on working channel assignments/de-assignments detected on the dedicated control channel 18. That is, the SU 12 can be configured to constantly monitor the dedicated control channel 18 when it is not currently involved in a call or transmitting an inbound request of its own. For example, the dedicated control channel 18 can be a predetermined frequency in the wireless communication system 10, and the SU 12 can constantly monitor the dedicated control channel 18 while not active on a voice and/or data call or transmitting an inbound request of its own. During the monitoring, the SU 12 can add/remove working channels from the idle working channel list based on whether or not they are idle. Of note, the tracking is performed locally at each of the SUs 12 without requiring scanning to determine the idle state of each of the working channels 14. Rather, the SUs 12 track the idle states by monitoring the dedicated control channel 18.

If the SU 12 needs to send an inbound request (step 34), the SU 12 randomly selects a channel to send the inbound request from a list of channels including idle working channels and the dedicated control channel (step 36). For example, assume the dedicated control channel 18 is CC and the idle working channels 14 are $CH_1$ to $CH_N$, N being the number of idle working channels 14 at the time of the inbound request, the SU method 30 can select, at random, one of $\{CC, CH_1$ to $CH_N\}$. If N is, for example, 5, then the SU method 30 can select, at random, one of six channels to send the inbound request, i.e. one of $\{CC, CH_1$ to $CH_5\}$. If, instead, all working channels 14 are in-use, i.e. there are no idle working channels, then the SU method 30 can select only one channel to send the inbound request, i.e. $\{CC\}$. Thus, by including the dedicated control channel 18 in the list as a potential channel for the inbound request, the SU method 30 retains a means to transmit the inbound request when there are no idle working channels, i.e. the SU method 30 selects the dedicated control channel 18 in this scenario.

Subsequently, the SU method 30 sends the inbound request on the selected channel (step 38). Of note, the inbound request only needs to be communicated between the SU 12 and the infrastructure 16 and/or the controller 20. That is, the inbound request does not need to be viewed by other SUs 12 that are also participating in the SU method 30 since the inbound request does not determine whether a working channel 14 is in use, but rather is simply a request for a working channel, for example. In this manner, the inbound request can be sent over an idle working channel and not the dedicated control channel 18. It is expected that using the idle working channels in addition to the dedicated control channel 18 will significantly reduce traffic and collisions on the dedicated control channel 18 by off-loading inbound requests and/or outbound responses that do not need to be monitored by other SUs in the system.

Of note, the SUs 12 do not use a scan methodology to find an idle working channel, nor does the infrastructure 16 or controller 20 page SU 12 to an idle working channel. Instead, each SU 12 monitors the outbound dedicated control channel 18 for activity on the specific working channels available at the site. A site can include the dedicated control channel 18 and the N working channels 14. By monitoring the outbound dedicated control channel 18, each SU 12 can determine which working channels at a site are idle and available for use as a supplementary control channel. Therefore, if the SU 12 wishes to send control information, it can utilize a dynamic list of idle working channels that it has been tracking over time based on control channel traffic and immediately send the control information on a selected one of the idle working channels without individually scanning for idle working channels prior to transmitting the control information.

In the SU method 30, if the SU 12 is participating in or brought into a voice and/or data call (step 40), the SU 12 flushes the list of idle working channels and recreates the list following the end of the call (step 42). Then, the SU 12 can rebuild the list of idle working channels. More specifically, during the pendency of the call, the SU 12 may not be able to monitor the outbound dedicated control channel 18. Accordingly, the list of idle working channels can become dated and incorrect during the call. Thus, the SU 12 can simply start with an empty list following the call, and add new idle working channels to the list based on the monitoring of the outbound dedicated control channel 18. In this manner, the list is again populated and ready for use when the SU 12 needs to make a new inbound control information transmission subsequent to the end of the call. Further, an empty list simply requires the SU 12 to use the outbound dedicated control channel 18 for any new inbound control information transmissions until the SU has enough time to determine the status of some or all of the working channels at the site.

Figure 3:
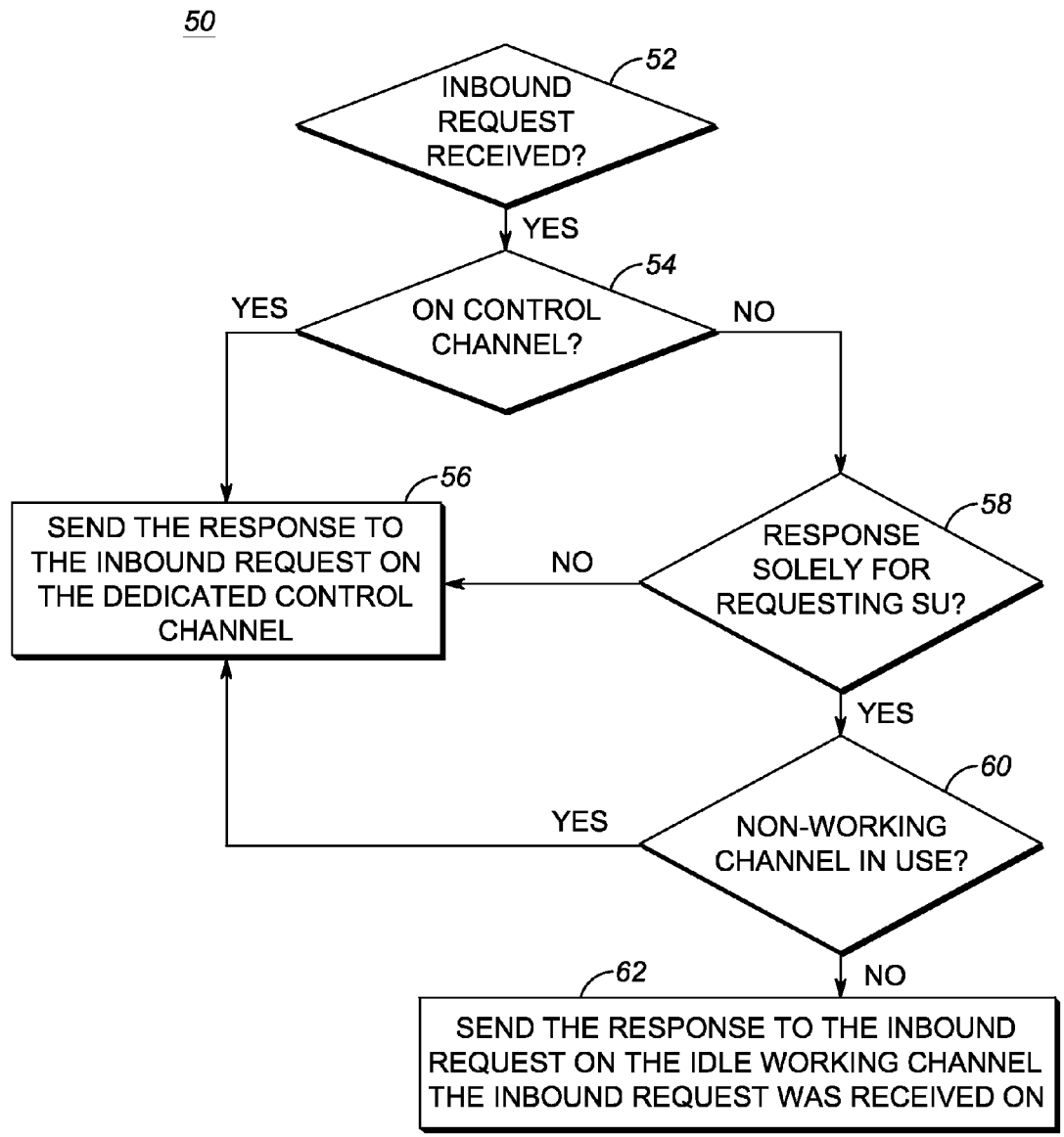
FIG. 3 is a flowchart of an infrastructure-based method for utilizing idle working channels as flexible control channels in accordance with some embodiments.

FIG. 3 is a flowchart of an infrastructure-based method 50 for utilizing idle working channels as flexible control channels in accordance with some embodiments. The infrastructure-based method 50 can be implemented by the infrastructure 16 and/or the controller 20 on the dedicated control channel 18 and the N working channels 14, and the infrastructure-based method 50 can be implemented with the SU method 30. The infrastructure-based method 50 initiates upon receiving an inbound request from one of the SUs 12 (step 52). If the inbound request was on the dedicated control channel 18 (step 54), the infrastructure-based method 50 sends any response to the inbound request on the dedicated control channel 18 (step 56). Of note, the SU 12 sending the inbound request will expect a response, if any, on the dedicated control channel 18 if the inbound request was sent on the dedicated control channel 18.

If the inbound request was not sent on the dedicated control channel (step 54), and was instead sent on one of the idle working channels as described in the SU method 30, the infrastructure-based method 50 checks if a response to the inbound request is solely for the requesting SU 12 (step 58). For example, the response to the inbound request is solely for the requesting SU 12 if it does not need to be seen by other SUs 12 in the wireless communication system 10, such as relating to a channel assignment for maintaining their lists of idle working channels. That is, the response to the inbound request is solely for the requesting SU 12 if the response does not impact the other SUs 12. An example of such an inbound request response is a registration response. An example of an inbound request response that impacts other SUs 12 is a call grant assigning a call to one of the working channels, which would cause the other SUs 12 to update their associated lists and mark the working channel 14 in the call grant as no longer idle. If the response to the inbound request is not solely for the requesting SU 12 (step 58), the infrastructure-based method 50 sends any response to the inbound request on the dedicated control channel 18 (step 56).

If the response to the inbound request is solely for the requesting SU 12 (step 58), the infrastructure-based method 50 checks if the idle working channel is now in use (step 60). If the idle working channel is now in use as a traffic channel, the infrastructure-based method 50 sends any response to the inbound request on the dedicated control channel 18 (step 56). The (previously idle) working channel is in use if it has subsequently been assigned as a traffic channel and is no longer considered an idle working channel. In this case, the response to the request must be sent on the dedicated control channel. If the (previously idle) working channel is still not in use, the infrastructure-based method 50 sends the response to the inbound request on the same working channel the inbound request was received on (step 62). Note that the requesting SU 12 may be configured to monitor the dedicated control channel 18, and may also look for a response to any sent inbound requests on the selected working channel, e.g., by repeatedly and alternately scanning the two channels, by monitoring the selected working channel for use by other radios and switching back to the dedicated control channel if such use is detected (and receiving the response there), or by using two receivers in the radio (one to monitor each channel). Other possibilities exist as well.

Figure 4:
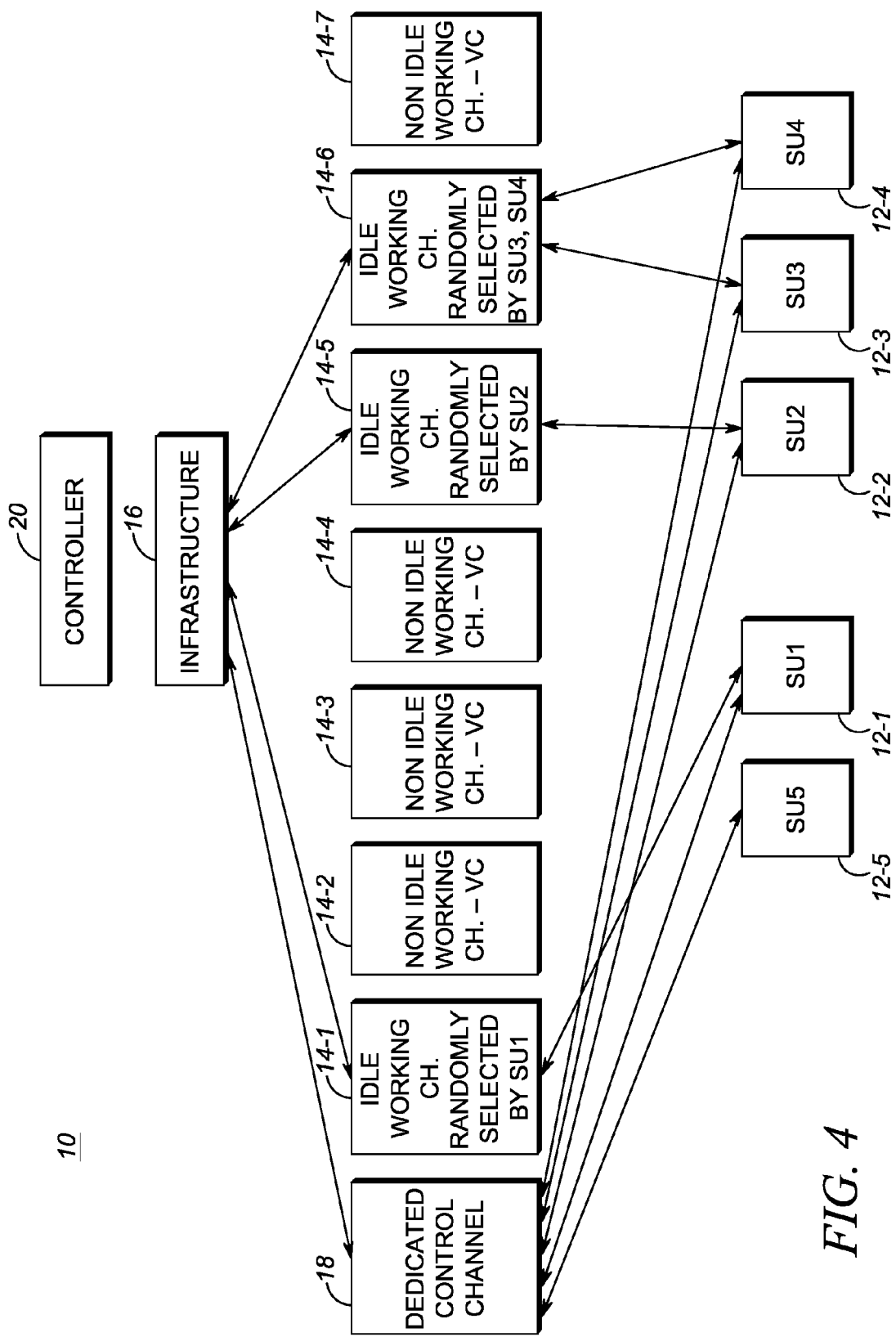
FIG. 4 is a network diagram of an exemplary operation of the SU method and the infrastructure-based method in accordance with some embodiments.

FIG. 4 is a network diagram of an exemplary operation of the SU method 30 and the infrastructure-based method 50 in accordance with some embodiments. The exemplary operation is illustrated with reference to the wireless communication system 10 including five SUs 12-1-12-5, seven working channels 14-1-14-6, and the dedicated control channel 18. At the time of the exemplary operation, the working channels 14-2, 14-3, 14-4 are in use such that each of the SUs 12-1-12-5 include a list with working channels 14-1, 14-5, 14-6, 14-7 designated as idle working channels. Each of the SUs 12-1-12-5 is not actively in a call and is monitoring the dedicated control channel 18.

First, the SU 12-1 has an inbound request to send to the infrastructure 16, and the SU 12-1 randomly selects the working channel 14-1 from amongst the idle working channels 14-1, 14-5, 14-6, 14-7 and the dedicated control channel 18. The infrastructure 16 sends a response to the inbound request on the selected working channel 14-1. Second, the SU 12-2 has an inbound request to send to the infrastructure 16, and the SU 12-2 randomly selects the working channel 14-5 from amongst the idle working channels 14-1, 14-5, 14-6, 14-7 and the dedicated control channel 18. The infrastructure 16 sends a response to the inbound request on the selected working channel 14-5.

Next, the SUs 12-3, 12-4 both have an inbound request and each select the working channel 14-6. If the SUs 12-3, 12-4 operate on the dedicated control channel 18 simultaneously, a collision could happen and a similar back-off and retry mechanism could be used. Next, the SU-5 has an inbound request, and selects the dedicated control channel 18, and the infrastructure 16 sends a response on the dedicated control channel 18. Another example could include an inbound request such as from the SU 12-1 on the working channel 14-1, but the response is sent on the dedicated control channel 18 since the response is not individually targeted, and may include, for example, working a channel assignment.

Figure 5:
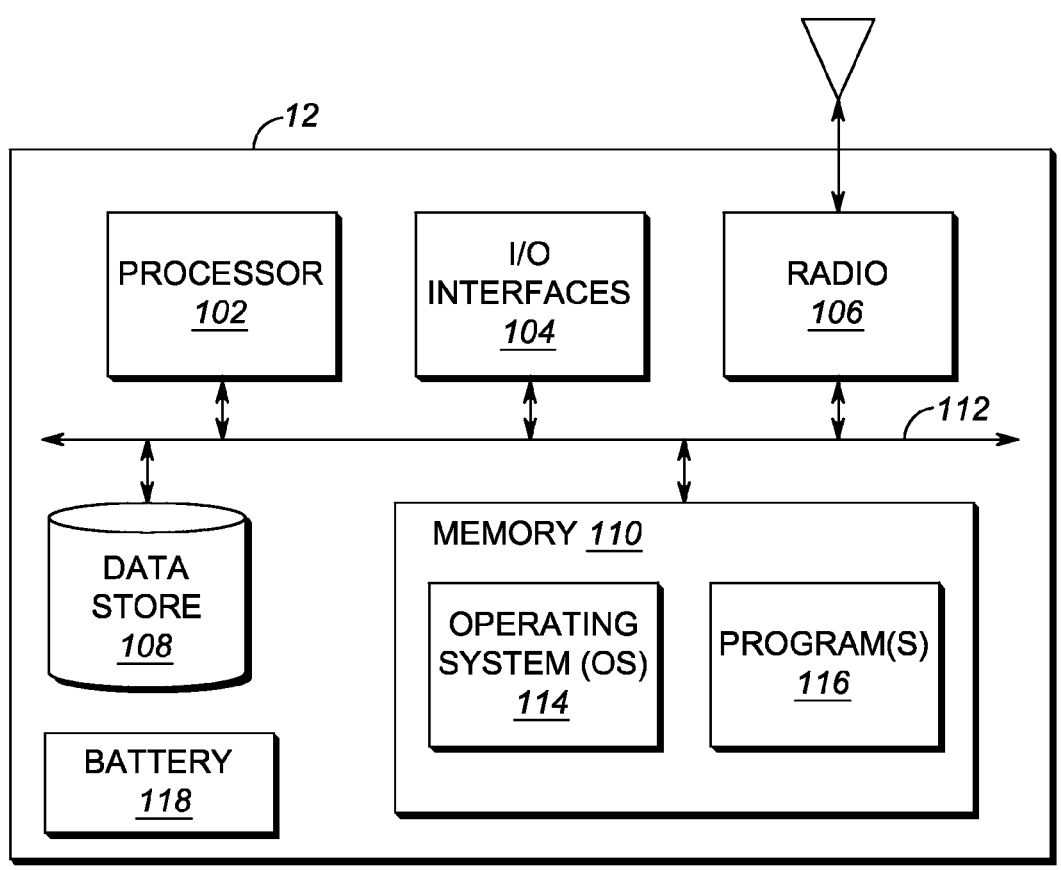
FIG. 5 is a block diagram of the SU in the wireless communication system of FIG. 1 in accordance with some embodiments.

FIG. 5 is a block diagram of the SU 12 in the wireless communication system 10 in accordance with some embodiments. The SU 12 can be a digital device that, in terms of hardware architecture, generally includes a processor 102, input/output (I/O) interfaces 104, a radio 106, a data store 108, and memory 110. It should be appreciated by those of ordinary skill in the art that FIG. 5 depicts the SU 12 in an oversimplified manner, and a practical embodiment can include additional components and suitably configured processing logic to support known or conventional operating features that are not described in detail herein. The components (102, 104, 106, 108, and 110) are communicatively coupled via a local interface 112. The local interface 112 can be, for example but not limited to, one or more buses or other wired or wireless connections, as is known in the art. The local interface 112 can have additional elements, which are omitted for simplicity, such as controllers, buffers (caches), drivers, repeaters, and receivers, among many others, to enable communications. Further, the local interface 112 may include address, control, and/or data connections to enable appropriate communications among the aforementioned components.

The processor 102 is a hardware device for executing software instructions. The processor 102 can be any custom made or commercially available processor, a central processing unit (CPU), an auxiliary processor among several processors associated with the SU 12, a semiconductor-based microprocessor (in the form of a microchip or chip set), or generally any device for executing software instructions. When the SU 12 is in operation, the processor 102 is configured to execute software stored within the memory 110, to communicate data to and from the memory 110, and to generally control operations of the SU 12 pursuant to the software instructions. In an exemplary embodiment, the processor 102 may include a mobile optimized processor such as optimized for power consumption and mobile applications. The I/O interfaces 104 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 104 can also include, for example, a serial port, a parallel port, a small computer system interface (SCSI), an infrared (IR) interface, a radio frequency (RF) interface, a universal serial bus (USB) interface, and the like. The I/O interfaces 104 can include a graphical user interface (GUI) that enables a user to interact with the SU 12.

The radio 106 enables wireless communication to an external access device or network. Any number of suitable wireless data communication protocols, techniques, or methodologies can be supported by the radio 106, including, without limitation: RF; TETRA; Land Mobile Radio (LMR); DMR; IrDA (infrared); Bluetooth; ZigBee (and other variants of the IEEE 302.15 protocol); IEEE 302.11 (any variation); IEEE 302.16 (WiMAX or any other variation); Direct Sequence Spread Spectrum; Frequency Hopping Spread Spectrum; LTE; cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; Project 25 (P25); proprietary wireless data communication protocols such as variants of Wireless USB; and any other protocols for wireless communication. The SU 12 can support any wireless protocol that operates over a plurality of channels and uses a dedicated control channel as described herein.

The data store 108 can be used to store data. The data store 108 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 can incorporate electronic, magnetic, optical, and/or other types of storage media. The memory 110 can include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 110 may incorporate electronic, magnetic, optical, and/or other types of storage media. Note that the memory 110 can have a distributed architecture, where various components are situated remotely from one another, but can be accessed by the processor 102. The software in memory 110 can include one or more software programs, each of which includes an ordered listing of executable instructions for implementing logical functions. In the example of FIG. 5, the software in the memory 110 includes a suitable operating system (O/S) 114 and programs 116. The operating system 114 essentially controls the execution of other computer programs, and provides scheduling, input-output control, file and data management, memory management, and communication control and related services.

The programs 116 can include various applications, add-ons, etc. configured to provide end user functionality with the SU 12 such as implementing the SU method 30 including one or more of the steps set forth in FIG. 2. The SU 12 can also include a battery 118 or other suitable power source for the various components associated therewith. In an exemplary embodiment, the programs 116 and/or the O/S 114 can include instructions that, when executed, cause the processor 102 to locally maintain a status of each working channel of the plurality of working channels, responsive to an inbound request, select one of a plurality of idle working channels of the plurality of working channels and a dedicated control channel, and direct the radio 106 to send the inbound request on the selected channel. For example, the SU 12 can locally maintain the status in the data store 108 and/or in the memory 110.

The instructions, when executed, can further cause the processor to: direct the radio 106 to monitor the dedicated control channel; and update the status of the idle working channels based on channel assignments and de-assignments monitored on the dedicated control channel. The instructions, when executed, can further cause the processor to randomly select one of the plurality of idle working channels and the dedicated control channel. The instructions, when executed, can further cause the processor to select the dedicated control channel when each of the plurality of working channels is in use. The instructions, when executed, can further cause the processor to: receive a response from the radio 106 to the inbound request on the dedicated control channel if the response impacts other subscriber units in the wireless communication system 10; and receive the response from the radio 106 on a selected channel of the plurality of idle working channels if the response is directed solely to a requesting subscriber unit.

The instructions, when executed, can further cause the processor to receive a response from the radio 106 to the inbound request on the dedicated control channel if the inbound request was sent on a selected channel of the plurality of idle working channels and the selected channel is in use. The instructions, when executed, can further cause the processor to perform the selecting and the sending without directing the radio 106 to scan to determine which channels of the plurality of working channels are idle. The instructions, when executed, can further cause the processor to: select one of the plurality of idle working channels for the radio 106 to send the inbound request; and receive a response from the radio 106 to the inbound request to the inbound request on the dedicated control channel. The instructions, when executed, can further cause the processor to flush the status of each working channel of the plurality of working channels subsequent to participating in a voice or data call.

Figure 6:
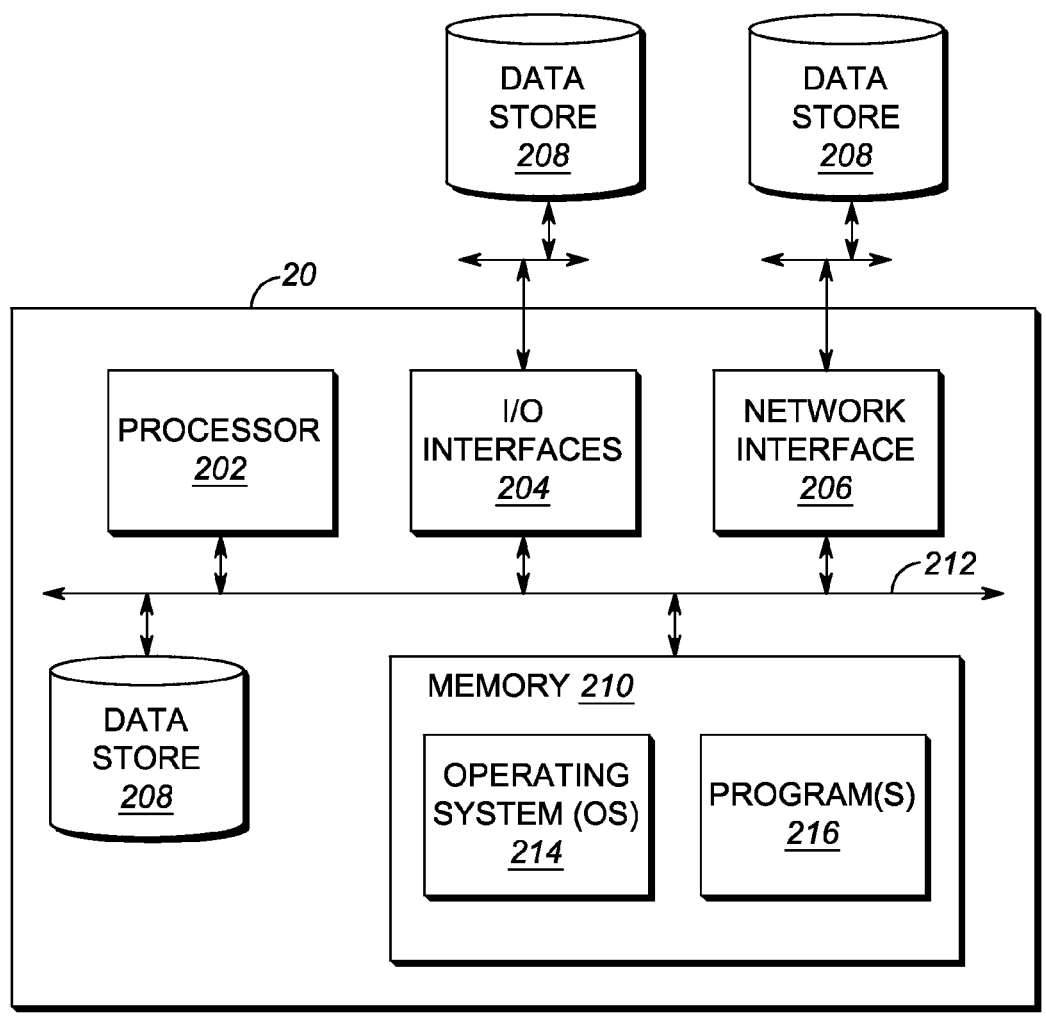
FIG. 6 is a block diagram of a controller which may be used in the wireless communication system of FIG. 1 in accordance with some embodiments.

FIG. 6 is a block diagram of a controller 20 which may be used in the wireless communication system 10 in accordance with some embodiments. The controller 20 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 6 depicts the controller 20 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the controller 20, a semiconductor-based microprocessor (in the form of a microchip or chip set), or generally any device for executing software instructions. When the controller 20 is in operation, the processor 202 is configured to execute software stored within the memory 210, to communicate data to and from the memory 210, and to generally control operations of the controller 20 pursuant to the software instructions. The I/O interfaces 204 may be used to receive user input from and/or for providing system output to one or more devices or components.

The network interface 206 may be used to enable the controller 20 to communicate on a network, such as the Internet, a wide area network (WAN), a local area network (LAN), and the like, etc. such as to communicate to the infrastructure 16. The network interface 206 can include multiple devices to enable multiple connections to the network. The network interface 206 may include, for example, an Ethernet card or adapter (e.g., 10 BaseT, Fast Ethernet, Gigabit Ethernet, 10 GbE, etc.) or a wireless local area network (WLAN) card or adapter (e.g., 802.11a/b/g/n). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the controller 20 such as, for example, an internal hard drive connected to the local interface 212 in the controller 20. Additionally in another embodiment, the data store 208 may be located external to the controller 20 such as, for example, an external hard drive connected to the I/O interfaces 204 (e.g., SCSI or USB connection). In a further embodiment, the data store 208 may be connected to the controller 20 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the infrastructure-based method 50 as set forth in FIG. 3 and the like.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A subscriber unit-based method using a plurality of idle working channels as flexible control channels in a wireless communication system having a dedicated control channel, comprising an inbound dedicated control channel and an outbound dedicated control channel, and a plurality of working channels, the method comprising:
monitoring, by the requesting subscriber unit, the outbound dedicated control channel;
locally maintaining, by a requesting subscriber unit, a status indication of each working channel of the plurality of working channels;
responsive to detecting a request for transmission of control information on the inbound dedicated control channel:
identifying working channels that are currently idle;
randomly selecting one channel amongst the plurality of idle working channels and the inbound dedicated control channel to send control information;
sending, by the requesting subscriber unit, the control information on the inbound control channel in response to no idle working channels being available at the moment the control information is being sent; and
sending the control information on one of the inbound control channel and an idle working channel in response to the idle working channel being available at the moment the control information is being sent.

2. The subscriber unit-based method of claim 1, further comprising:
updating, via the monitoring of the outbound dedicated control channel, the status indications based on channel assignments and de-assignments detected on the outbound dedicated control channel.

3. The subscriber unit-based method of claim 1, further comprising:

randomly selecting the channel out of the plurality of available channels.

4. The subscriber unit-based method of claim 1, further comprising:
responsive to detecting, by the requesting subscriber unit, a subsequent request for transmission of second control information on the inbound dedicated control channel, selecting the inbound dedicated control channel as the selected channel to transmit the second control information when none of the plurality of working channels is determined, by the requesting subscriber unit, to be idle.

5. The subscriber unit-based method of claim 1, further comprising:
receiving a response to the sent control information on the dedicated outbound control channel when the response impacts other subscriber units in the wireless communication system; and
receiving the response on the selected channel when the response solely impacts the requesting subscriber unit.

6. The subscriber unit-based method of claim 1, further comprising:
receiving a response to the sent control information on the dedicated outbound control channel when the control information was sent on the selected channel and the selected channel is no longer idle.

7. The subscriber unit-based method of claim 1, further comprising:
performing the identifying, selecting, and the sending without scanning the working channels to separately determine which working channels are idle responsive to detecting the request for transmission of control information.

8. The subscriber unit-based method of claim 1, further comprising:
selecting one of the plurality of idle working channels for the sending of the control information; and
receiving a response to the sent control information on the dedicated outbound control channel.

9. The subscriber unit-based method of claim 1, further comprising:
returning to monitoring the dedicated outbound control channel and flushing the status indication of each working channel subsequent to participating in a voice or data call.

10. A subscriber unit using idle working channels as flexible control channels in a wireless communication system having a dedicated control channel, comprising an inbound dedicated control channel and an outbound dedicated control channel, and a plurality of working channels, the subscriber unit comprising:
a radio configured to operate on a plurality of channels comprising the dedicated control channel and the plurality of working channels in the wireless communication system;
a processor communicatively coupled to the radio; and
memory storing instructions that, when executed, cause the processor to:
monitor, via the radio, the outbound dedicated control channel;
locally maintain a status indication of each working channel of the plurality of working channels;
responsive to detecting a request for transmission of control information on inbound dedicated control channel:
identify working channels that are currently idle;
randomly select one channel amongst the plurality of idle working channels and the inbound dedicated control channel to send control information;
cause the radio to send the control information on the selected inbound control channel in response to no idle working channels existing at the moment the control information is being sent; and
cause the radio to send the control information on one of the inbound control channel and an idle working channel in response to the idle working channel existing at the moment the control information is being sent.

11. The subscriber unit of claim 10, wherein the instructions, when executed, further cause the processor to:
update, via the monitoring of the outbound dedicated control channel, the status indications based on channel assignments and de-assignments detected on the outbound dedicated control channel.

12. The subscriber unit of claim 10, wherein the instructions, when executed, further cause the processor to:
randomly select the channel out of the plurality of available channels.

13. The subscriber unit of claim 10, wherein the instructions, when executed, further cause the processor to:
detect a subsequent request for transmission of second control information on the inbound dedicated control channel, and to select the dedicated inbound control channel as the selected channel to transmit the second control information when none of the plurality of working channels is determined to be idle.

14. The subscriber unit of claim 10, wherein the instructions, when executed, further cause the processor to:
receive a response to the sent control information on the dedicated outbound control channel when the response impacts other subscriber units in the wireless communication system; and
receive the response on the selected channel when the response solely impacts the requesting subscriber unit.

15. The subscriber unit of claim 10, wherein the instructions, when executed, further cause the processor to:
receive a response to the sent control information on the dedicated outbound control channel when the sent control information was sent on the selected channel and the selected channel is no longer idle.

16. The subscriber unit of claim 10, wherein the instructions, when executed, further cause the processor to:
perform the identifying, selecting, and the sending without scanning the working channels to separately determine which working channels are idle responsive to detecting the request for transmission of control information.

17. The subscriber unit of claim 10, wherein the instructions, when executed, further cause the processor to:
select one of the plurality of idle working channels for the sending of the control information; and
receive a response to the sent control information on the dedicated outbound control channel.

* * * * *